3,636,212
METHOD FOR CONTROLLING RODENTS WITH CERTAIN BIS-AZIRIDINE ACETYL CHEMOSTERILANTS

Wilfred A. Skinner, Portola Valley, and Homer H. C. Tong, San Jose, Calif., assignors to Stanford Research Institute, Menlo Park, Calif.
No Drawing. Filed May 1, 1969, Ser. No. 821,121
Int. Cl. A01n 9/22
U.S. Cl. 424—244
1 Claim

ABSTRACT OF THE DISCLOSURE

Management or control of mammals, e.g. live pests of the type of rodents, such as rats or mice, is accomplished by placing, in an area in which these rodents are to be managed, an effective amount of a certain bis-aziridine acetyl derivative or derivatives of a class defined below.

BACKGROUND OF INVENTION

The invention relates to the control or management of mammals, for example, rodents, such as rats and mice. The invention also pertains to the protection of areas, fields, buildings, etc., against intrusion and propagation of, and therefore ravaging and soiling by such pests.

The control of rats and mice is one of the major problems confronting farmers and city managers at this time. For instance, the loss of grain, nuts, cane sugar, and artichokes by rodent consumption represents considerable financial losses to farmers each year. Likewise, cities frequently spend many thousands of dollars a year in an attempt to rid themselves of rats.

Various means have been employed to rid certain localities of mice and rats. One of the more prevalent techniques involves the use of poisons, the consumption of which exterminates the pests. Such a technique is not the most ideal, particularly in cities where the presence of dead animals in buildings, etc. may create health hazards.

It is therefore the main object of the present invention to provide a method for control or management of rats and mice and other pests. Another object of the invention is to provide a composition suitable for use in the control or management of rodents, e.g. mice population. Still another object is to clear areas of rodent populations, and to maintain these areas clear without causing the creation of unhealthy conditions, e.g. without killing the rodent population and without the subsequent decay of their carcasses.

It is still another object of the present invention to provide a class of compounds which, when ingested in a sufficient amount decreases materially (if not completely) the fertility of the male rodents, thereby decreasing their population and even causing such rodents to cease existing in the areas treated.

SUMMARY OF INVENTION

It has now been discovered that the ingestion by male rodents, e.g. male rats and mice, of even small amounts of certain bis-aziridineacetyl derivatives caused sterility in the males of the aforesaid rodents, so that their copulation with females will not and does not for an extended period of time produce reproduction. In other words, the ingestion (whether orally or through the peritoneum) of the aforementioned bis-aziridineacetyl derivatives produced sterility, or at least a markedly reduced or inhibited reproductive capacity.

The compounds which, according to the process of the present invention cause sterility in the male rodents, may be broadly defined as being N,N-bis(aziridineacetyl) alpha, omega-hydrocarbyl diamines in which the hydrocarbyl radical is a divalent hydrocarbyl radical.

DESCRIPTION OF PREFERRED EMBODIMENT

The above defined class of pest controls may be illustrated by the following structural formula:

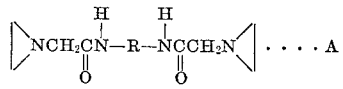  .... A in which R may be a divalent hydrocarbyl radical, e.g. a polymethylene radical, preferably having from about 4 to about 12 methylene radicals and more (preferably 6 to 9 methylene radicals) or a phenylene (or a hydrocarbon, e.g. methyl substituted)phenylene (or arylene) radical, or also a cyclohexylene, or hydrocarbon-substituted cyclohexylene radical, e.g. cyclohexyldimethylene radical.

Specific compounds included within the scope of the present invention are:

N,N'-bis(aziridineacetyl)-1,6-hexamethylene diamine,
N,N'-bis(aziridineacetyl)-1,7-heptamethylene diamine,
N,N'-bis(aziridineacetyl)-1,8-octamethylene diamine,
N,N'-bis(aziridineacetyl)-1,9-nonamethylene diamine,
N,N'-bis(aziridineacetyl)-1,10-decamethylene diamine,
N,N'-bis(aziridineacetyl)-1,11-undecamethylene diamine,
N,N'-bis(aziridineacetyl)-1,12-dodecamethylene diamine, and/or other polymethylene diamines in which the polymethylene radical has more methylene radicals, which may or may not be in a straight chain or as a branch chain, e.g. N,N'-bis(aziridineacetyl)-1,8-octamethylene-4-methyldiamine.

Still other illustrative (but not limiting) examples of the aziridine acetyl derivatives falling within the class of compounds which have a sterility action on male rodents, include:

N,N'-bis(aziridineacetyl)-1,4-cyclohexyldimethylenediamine,
N,N'-bis(aziridineacetyl)-1,4-phenylene diamine,
N,N'-bis(aziridineacetyl)-1,4-xylylene diamine, as well as structurally similar bis(aziridineacetyl) hydrocarbyl diamines, and higher alkyl substituted derivatives thereof and of the specific compounds set forth above.

The compounds disclosed above are effective "rodent management" agents. Male rodents that have eaten even a very small amount of these "rodent management" or "rodent control" agents have reduced fertility, as this is shown by the specific examples below. Ingestion of a sufficient amount of at least one of the compounds of the invention defined above by one or more rodents results in a considerable lowering of the rodent population when such treated male mice were each paired with a fertile female.

The amount of the aziridine derivative necessary to be ingested by the rodent (to cause it to be sterile, or to cause it to have markedly lowered spermatogenic activity), will vary depending upon the particular compound employed, the species of rodent, as well as other factors. Ordinarily, rodent food treated in such a way that the rodent ingests an amount equivalent to from 10 to about 100 or more mg./kg. by wt. of the compounds of the invention, produces a treated material or food which when ingested by the male rodent causes it to be sterile for extended periods of time. In fact, in at least some instances this treatment inhibited reproduction during the whole spermatogenic cycle.

When employing the rodent management or control compounds of this invention to reduce the number of rodents in an area (by lowering the births due to the sterility induced in the males in accordance with the process of the present invention), one or more of the male rodents in the area to be cleared must ingest an effective amount of at least one of the compounds in order to achieve the best results.

The active sterilizing compounds can be ingested by the male rodents, e.g. male mice by feeding them treated food or by injecting a small amount of at least one of the compounds into at least one of the male rodents' bodies by suitable means, e.g. into the peritonium of the animal. The amount of effective compound ingested by a male rodent to get the best effect is generally within a range of from about 5 to about 500 mg. of the active ingredient per kg. of male rodent, usually in the range of 10 to 100 mg./kg. The compounds of the present invention can be applied to the food or water (for the male rodents) for their intended purpose as a concentrate or in combination with a carrier or other inert materials.

Whatever method is employed for treating the rodent food, the treated food will generally contain from 0.01 to about 10% by wt. of the rodent control compound, (preferably from 0.02 to 2 wt. percent). The lower percentages will, of course, be used when the more active agents are to be employed, while the higher percentages will be used with the less effective agents. Larger or smaller amounts, however, can be employed, when desired, although larger amounts are generally uneconomical and undesirable because they might cause death of the treated animals.

The compounds used as the management or control agents of the present invention are effective and less likely to kill the affected male rodents than agents heretofore available.

The following is an example of the preparation of a specific compound used in the process of the present invention:

PREPARATION OF N,N'-BIS(AZIRIDINEACETYL) 1,8-OCTAMETHYLENE DIAMINE

To a solution of 1.93 g. (0.005 mole) of bis(N,N'-bromoacetyl) octamethylene diamine in 100 ml. of ethanol containing 4.2 g. (0.03 mole) of anhydrous $K_2CO_3$ was added dropwise, 1.5 ml. (0.03 mole) of aziridine at room temperature. The solution was stirred several hours, left standing overnight, concentrated in vacuo to one-half its original volume, and filtered to remove inorganic salts. The filtrate was concentrated to dryness, extracted with warm benzene, and crystallized by the addition of hexane to yield 1 gram (64% yield) of a compound with a M.P. of 90° C. Spectral analysis of this compound proved it to be substantially pure N,N'-bis(aziridineacetyl) 1,8-octamethylene-diamine.

This process was used to produce, isolate, and purify the homologues of the above compound, namely, those having the general structure (A) supra, but having different divalent hydrocarbon radical for the R of the above formula, e.g. heptamethylene radical, cyclohexyl dimethylene radical, xylylene radical, etc.

In order that the invention may be more fully understood, the following examples are given by way of illustrations, it being clearly understood that the invention is not limited thereto.

EXAMPLE 1

The effect of the following four bis-aziridineacetyl derivatives on the reproductive activity of male mice were tested. The four compounds were:

N,N'-bis(aziridineacetyl)-1,8-octamethylenediamine (Compound I)
N,N'-bis(aziridineacetyl)-1,7-heptamethylenediamine (Compound II)
N,N'-bis(aziridineacetyl)-1,4-cyclohexyldimethylene-diamine (Compound III)
N,N'-bis(aziridineacetyl)-1,4-xylylene-diamine (Compound IV).

The testing methodology was as follows:

Each of the four compounds at the dosage indicated in Table I infra was injected i./p. (i.e. through the peritoneum) into each of a group of four male mice daily for five days. In all of these tests the compound was first dissolved in a 0.85% saline solution, and the saline solution containing the compound was then injected into the rodent, each compound for 5 days consecutively with the indicated dosage. On the seventh day (from the first injection) each treated male mouse was paired with a fertile female which was replaced each week for a total of eight weeks. The resultant week-by-week fertility data are summarized in the following table:

TABLE I

| Compound: | Dose, mg./kg. i.p. ×5 | Average week litter size | | | | | | | |
|---|---|---|---|---|---|---|---|---|---|
| | | 1 | 2 | 3 | 4 | 5 | 6 | 7 | 8 |
| I | 20 | 0 | 3 | 0 | 0 | 0 | 7 | 5 | 8 |
| II | 20 | 0 | 0 | 0 | 0 | 0 | 7 | 5 | 10 |
| III | 20 | 2 | 0 | 0 | 0 | 0 | 0 | 0 | 0 |
| III | 10 | 1 | 2 | 0 | 1 | 1 | 3 | 12 | 7 |
| IV | 5 | 3 | 0 | 0 | 2 | 0 | 1 | 3 | 5 |
| Control | (¹) | 6 | 9 | 7 | 10 | 10 | 7 | 11 | 4 |

¹ Saline solution.

EXAMPLE 2

In this series of tests the antifertility agent was the compound identified as Compound III in Example 1; namely, N,N'-bis(aziridineacetyl)-1,4-cyclohexyldimethylene-diamine. This compound was caused to be ingested orally by the male mice in a solution of 0.85% saline. The compound was ingested on five consecutive days in amounts of 20 mg./kg. of male mouse treated. As in the previous example, the male mouse thus treated was then paired with a fertile female which was replaced each week. The resultant week-by-week fertility data was:

TABLE II

| | Dose | Week-by-week fertility | | | | | | | |
|---|---|---|---|---|---|---|---|---|---|
| | | 1 | 2 | 3 | 4 | 5 | 6 | 7 | 8 |
| Compound III | Oral injection 20 mg./kg.×5. | 5 | 4 | 0 | 0 | 0 | 0 | 4 | 5 |
| Control | Saline solution | 1 | 2 | 7 | 2 | 9 | 10 | 9 | 7 |

EXAMPLE 3

Example 2 was repeated using five oral ingestions of 40 mg./kg. of Compound III. The results were as follows:

TABLE III

| | Dose | Week-by-week fertility | | | | | | | |
|---|---|---|---|---|---|---|---|---|---|
| | | 1 | 2 | 3 | 4 | 5 | 6 | 7 | 8 |
| Compound III | Oral injection 40 mg./kg.×5. | 5 | 0 | 0 | 0 | 0 | 0 | 0 | 11 |
| Control | Saline solution | 1 | 2 | 7 | 2 | 9 | 10 | 9 | 7 |

EXAMPLE 4

In this experiment Compound II was administered orally in a single dose of 500 mg./kg., the rest of the methodology used being the same as that given in Example 1. None of the females became pregnant over a period of five weeks, whereas in the control test, the females had (in successive weeks) on the average respectively 5, 11, 8 and 4 babies.

EXAMPLE 5

In this example (which was similar in all respects to that part of Example 1 where Compound I was used, except that 100 mg./kg. of Compound I was given to the males orally) the results showed that none of the females became pregnant over a period of five weeks.

The chemosterilants of the present invention may be used in actual practice in the field in different ways as is known in the art. They may be formulated with other materials or impregnated on carriers.

Having thus described the invention, we claim:
1. A method of sterilizing male mice which comprises orally administering to said mice an effective antispermatogenic amount of a compound selected from the group consisting of N,N'-bis (aziridineacetyl)-1,8-octamethylene-diamine, N,N' - bis(aziridineacetyl) - 1,7 - heptamethylene-diamine, N,N' - bis(aziridineacetyl) - 1,4 - cyclohexyl-dimethylene-diamine and N,N'-bis(aziridineacetyl)-1,4-xylylene-diamine.

References Cited

Borkovec, Insect Chemosterilants. Interscience Pub. 1966—pp. 17–21.
Chemical Abstract I 63: 11398f, 1965.
Chemical Abstract II 65: 5427f, 1966.
Chemical Abstract III 66: 92769w, 1967.

ALBERT T. MEYERS, Primary Examiner

L. SCHENKMAN, Assistant Examiner